United States Patent [19]
Bartlett et al.

[11] Patent Number: 5,491,747
[45] Date of Patent: Feb. 13, 1996

[54] NOISE-CANCELLING TELEPHONE HANDSET

[75] Inventors: Charles S. Bartlett, Clinton, Md.;
Roger D. Benning, Long Valley, N.J.;
John B. Hunter, Basking Ridge, N.J.;
Charles Sanford, Somerset, N.J.;
Michael A. Zuniga, Fairfax, Va.

[73] Assignee: AT&T Bell Corp., Coral Gables, Fla.

[21] Appl. No.: 279,389

[22] Filed: Jul. 25, 1994

Related U.S. Application Data

[63] Continuation of Ser. No. 954,175, Sep. 30, 1992, abandoned.

[51] Int. Cl.$^6$ .................................................. H04M 1/00
[52] U.S. Cl. ........................... 379/433; 379/434; 379/430
[58] Field of Search ................................. 379/433, 430, 379/428, 434; 381/183, 187, 96, 94, 71, 72

[56] References Cited

U.S. PATENT DOCUMENTS

| | | |
|---|---|---|
| 4,087,653 | 5/1978 | Frieder, Jr. et al. ............... 379/430 |
| 4,782,527 | 11/1988 | Williamson et al. ............... 379/433 |
| 5,058,154 | 10/1991 | Anderson ........................ 379/433 |
| 5,182,774 | 1/1993 | Bourk .............................. 379/430 |

Primary Examiner—Jeffrey A. Hofsass
Assistant Examiner—Jack Chiang
Attorney, Agent, or Firm—Charles E. Graves; Martin I. Finston

[57] ABSTRACT

A radio or telephone handset configured with the usual transmitter and receiver ends and connecting handle is designed to have physical characteristics well adapted in its acoustic characteristics to complement noise cancellation circuitry. The receiver speaker is mounted in the receiver cap, and the cap is built with a domed, apertured earpiece extending from the exterior surface of said receiver cap. The dome fits into a user's outer ear, thereby to aid in positioning said handset on a user's ear. Openings radially placed on said receiver cap exterior surface and surrounding said earpiece, define an acoustic grill through which signal from said receiver speaker is passed substantially directly to said user's ear canal. Noise absorbing material is placed at strategic locations within the handset interior.

6 Claims, 5 Drawing Sheets

NOISE-CANCELLING TELEPHONE HANDSET

This application is a continuation of now abandoned application Ser. No. 07/954,175, filed on Sep. 30, 1992.

FIELD OF THE INVENTION

This invention relates to telephonic handset apparatus and, more specifically, to a handset structured to enhance the capability of noise cancellation circuitry in reducing the energy of ambient noise that interferes with the intelligibility of an incoming voice signal.

BACKGROUND OF THE INVENTION

Handsets which are standard equipment in telephone and other telecommunication stations such as cellular terminals consist basically of a receiver and a transmitter microphone connected by a handgrip. The utility of the conventional handset in a noisy environment such as a construction site, a machine shop, an airport, a bus terminal, or a car telephone station is diminished due to their passing much of the interfering ambient noise to the user's ear. Accordingly, expedients such as a volume control sometimes are used in handsets of the prior art to improve incoming speech intelligibility by increasing the incoming sound signal relative to the noise signal level. The same unwanted noise still passes to the user, however, and the resulting signal-to-noise ratio still substantially interferes with the speech intelligibility.

Although handsets of the prior art typically have not employed noise-cancelling circuits, such circuits may be found, for example, in prior art headsets for aircraft use. Active noise-cancelling circuits typically pick up the ambient noise signal with a noise-cancelling microphone and create an inverted version of the unwanted signal that is applied to the receive channel where it subtractively interferes with the noise signal. The difficulty, however, in designing a handset which incorporates electronic cancellation techniques, has to do in part with the acoustic properties of a handset and specifically with matching of the phase and amplitude of the noise-cancelling signal to the noise itself. The handset must be designed to have an amplitude and phase response that is compatible with a practical control circuitry for the noise-cancelling operation.

SUMMARY OF THE INVENTION

According to this invention, there is provided an ambient noise-reducing telephone handset as claimed in claim 1. The earpiece of the handset receiver cap formed as a central aperture in which is mounted a housing. This housing contains the noise-cancellation microphone. A portion of the housing extends outwardly of the earpiece to fit into a user's outer ear. Microphone thus directly samples ambient noise in the immediate vicinity of the user's ear canal. The noise-cancellation circuitry responds to the ambient noise by producing a noise-reduction signal which is optimally phase-related to the ambient noise signal.

DETAILED DESCRIPTION OF ILLUSTRATIVE EMBODIMENT

Figure 1:
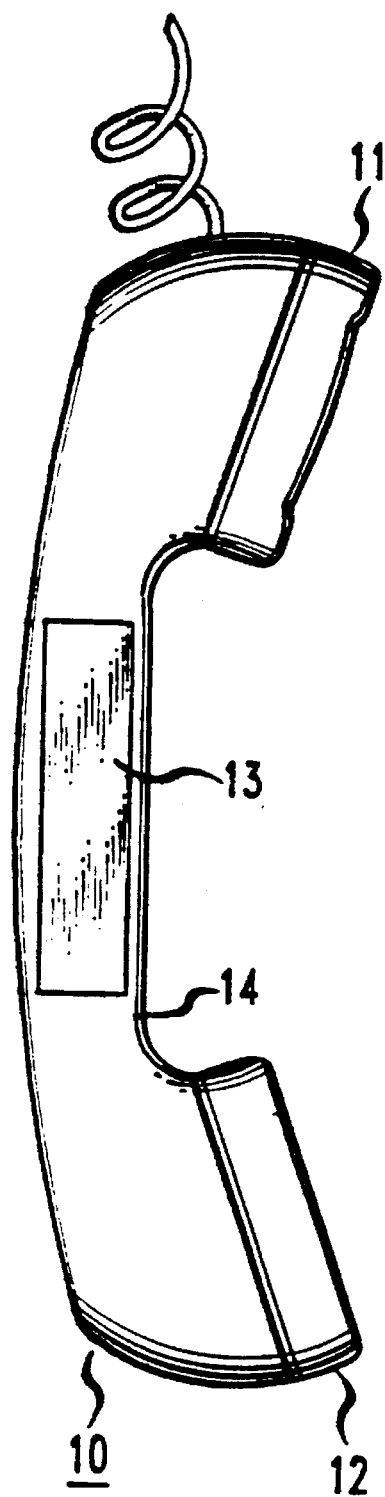
FIG. 1 is a schematic side view of an illustrative handset.

The noise-cancelling apparatus of the present invention is illustrated in a telephone handset denoted 10 in FIG. 1. Handset 10 is of basically conventional design and includes a transmitter cap 11 and a receiver cap 12. A quantity of acoustic blocking foam 13 is disposed in the handle portion 14 of the handset 10. Foam 13 may be of a material such as an open pore polyurethane having substantial resilience, good compliance and high acoustic damping properties. The foam 13 is a necessary part of the acoustic circuit in order to reduce as much as possible transmission of the user's spoken sound energy from the transmitter portion of the handset to the receiver portion. The foam also suppresses acoustic resonance in the handset interior by effectively controlling the air volume behind the receiver speaker.

Figure 2:
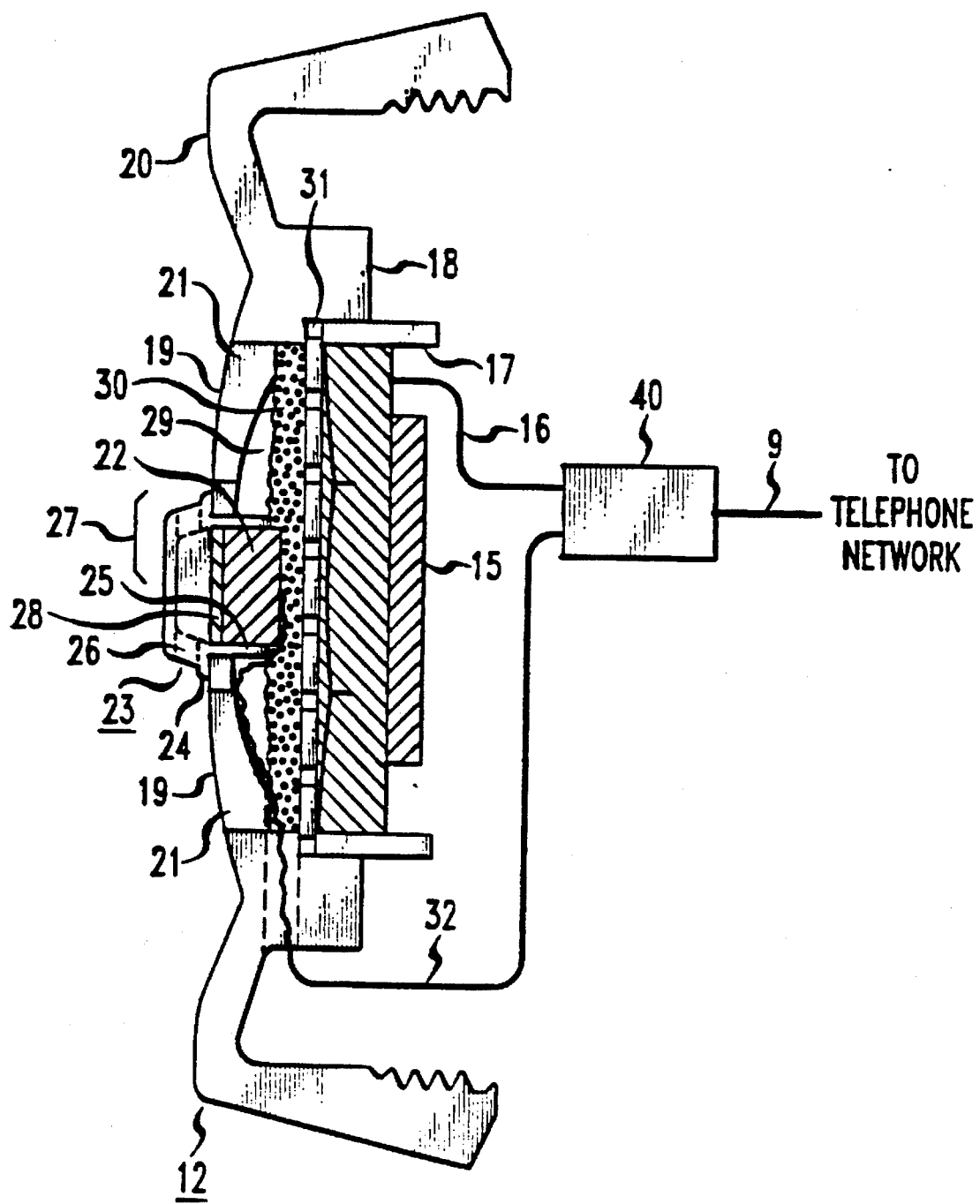
FIG. 2 is a schematic side diagram in partial section of the receiver cap detail of the illustrative handset.
Figure 3:
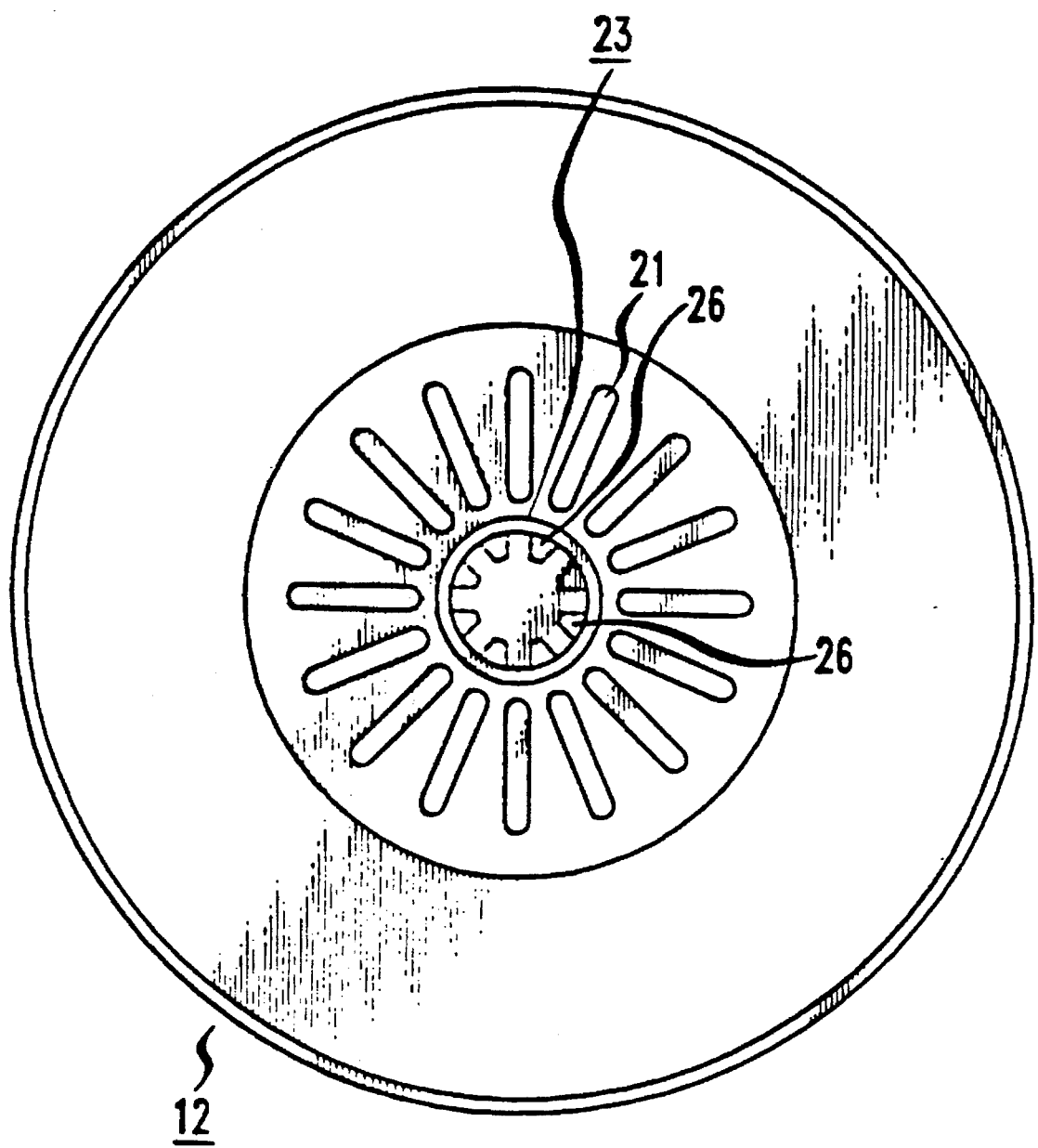
FIG. 3 is a frontal view sketch of the receiver cap detail.

As seen in FIGS. 2 and 3, the receiver cap 12 contains a telephone receiver or speaker denoted 15 which is connected by wire 16 to a telephone line 9 of communications network through a noise cancellation control circuit 40. Speaker 15 is contained within a speaker mounting sleeve 17 which fits snugly into an annular housing 18 of the receiver cap 12.

Receiver cap 12 is fabricated with a slightly domed earpiece 19 on the exterior surface 20 which contacts the user's ear. A series of radial slots 21 seen in FIG. 3 provide an acoustic grill through which the incoming signal from receiver 15 is passed to the user's ear canal. The slots 21 also are configured and positioned to pass sound over the shortest possible route from the receiver 15 to an error microphone 22 disposed in microphone housing 23.

In accordance with the invention, the microphone housing 23 includes a flange 24 for positioning housing 23 on earpiece exterior 20, and a sleeve 25 within which microphone 22 is fixedly mounted. Housing 23 also includes a series of sound ports 26 formed through an extension 27 of housing 23. Extension 27 is intended to fit and protrude slightly into the user's outer ear to aid in positioning the handset on the user's ear, and to place the microphone 22 as near to the ear as possible so that it senses the precise sound field which impinges on the user's ear. This degree of fit is needed in order to achieve an optimum noise-cancelling performance over the bandwidth reaching from approximately 100 Hz to 1,000 Hz which is most critical to control for improved speech intelligibility.

Further, as seen in FIGS. 2 and 3, sound ports 26 in combination with acoustic grill slots 21 form an acoustic path between receiver 15 and microphone 22 which is short and direct, and therefore presents relatively little acoustic resistance and phase delay. Minimizing the acoustic resistance between receiver 15 and microphone 22 is highly desirable to minimize phase delays between the control signal received by microphone 22 and the noise-cancellation signal generated in circuit 40. These signals should have as little phase difference as possible. While many variations on this requirement may be envisioned, the juxtaposition as illustrated in FIG. 3 shows the sound ports 26 and the elongate acoustic grill slots 21 as being located with respect to each other in the requisite proximity.

Microphone wires 32 connecting microphone 22 to the control circuit 10 may be exited from cavity 29 through a passage 32 formed in annular housing 18. Advantageously, a felt pad 28 is placed between the microphone 22 and the sound ports 26 to prevent dust or other particles from being introduced through the ports 26 onto the microphone 22. A layer of acoustically transmissive material may be added on top of the pad 28 to further insure against dust and moisture intrusion. The acoustic slots 21 likewise should not be so open as to permit particulate matter to be introduced therethrough or to allow users to gain entry into the interior of receiver cap 12 with paperclips or the like. A protective screen 31 advantageously is disposed over receiver 15. Screen 31 may be a perforated metal disc or grill. Acoustically, screen 31 serves the purpose of transmitting the sound emitted by receiver 15 without distortion or diminishment.

As seen in FIG. 2, receiver cap 12 includes a cavity 29 into which foam 30 is placed. Advantageously, the foam has characteristically open cell structure and is light in weight. A reticulated polyurethane foam is one suitable material. Foam 30 prevents din from intruding on the receiver 15 and also smooths the phase response, by damping undesirable resonant modes and reflections emanating from the enclosure and the user's ear.

In accordance with the invention, the residual phase delay between the noise-cancelling signal driving receiver 15 and the control signal generated by the microphone 22, may be predetermined.

Figure 4:
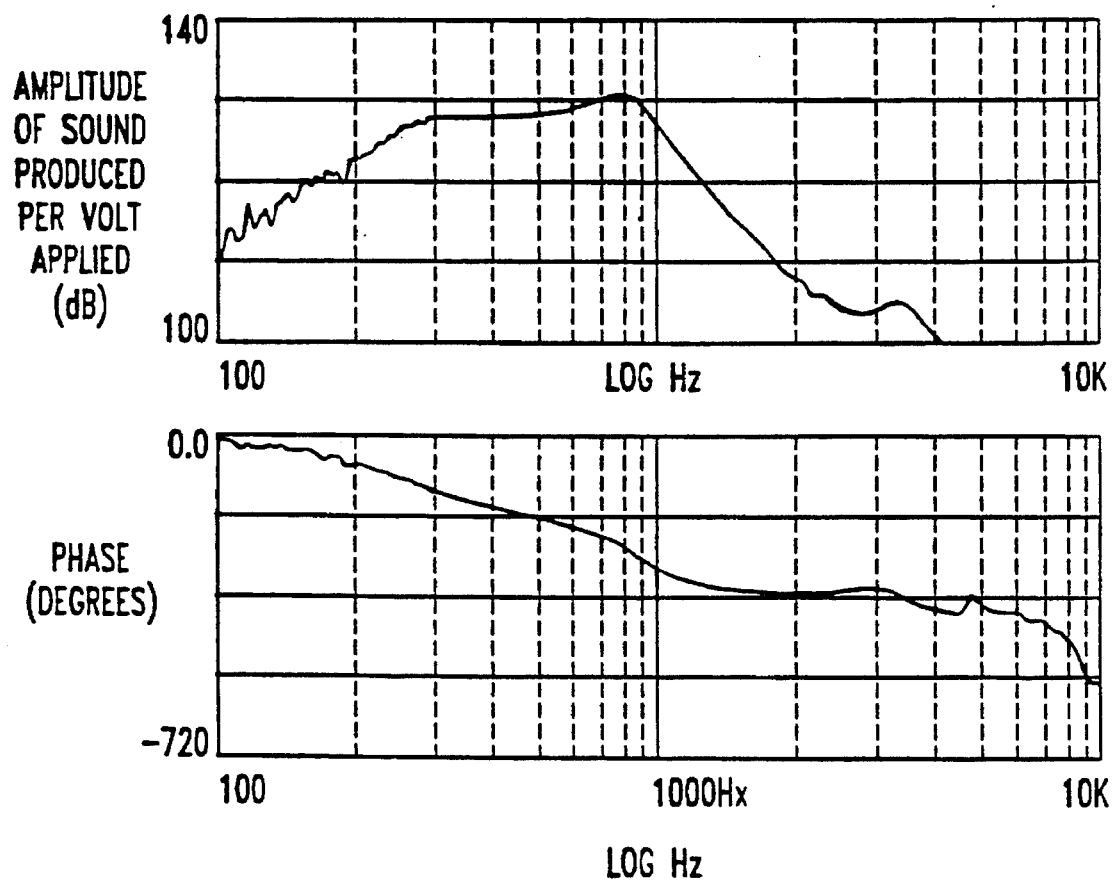
FIG. 4 is a graph showing a magnitude and phase delay relationship between the receiver speaker input drive voltage and the output voltage of the noise cancellation microphone.

A control circuit which may be used to advantage with the present invention is described in the patent application designated to Ser. No. 08/285,614, filed on Aug. 03, 1994, which is a continuation of the patent application Ser. No. 07/971,009, in the names of Benning et al., filed on Nov. 02, 1992 which is now abandoned, to Applicants' assignee. This patent application to the extent relevant is hereby incorporated by reference. The handset design of the present invention produces an electroacoustical transfer function from the speaker input voltage to the microphone output voltage that, with the addition of a low complexity compensation circuit of the cited patent application, provides excellent closed loop cancellation performance in the range of from 100 Hz to 1100 Hz. This transfer function, shown in FIG. 4, provides several valuable characteristics. First, it varies gradually with frequency, without erratic or peaked responses. Further, its magnitude rolls off at frequencies above about 1000 Hz such that substantially all resonant peaks above about 2000 Hz are down more than 20 dB from the maximum amplitude. Also, its phase lies between 0 and 360 degrees in the range of from about 100 Hz and in excess of 3000 Hz as seen in the lower curve of FIG. 4. The physical design concepts of the instant invention help achieve these results.

Importantly, the size and shape of the slots 21 and ports 26 must be controlled to avoid acoustic resonance of microphone 22 and the handset receiver enclosure. The volumes enclosed by the microphone housing 23 with associated ports 26 and microphone 22 comprise a potentially resonant acoustic chamber. Resonant response of this chamber at frequencies within the audible frequency range will introduce amplitude and phase response distortions that degrade the acoustic noise reduction performance. The configuration, diameter and length of ports 26 is selected to reduce this effect. Similar undesired resonant effects are avoided in the handset receiver enclosure through the configuration of slots 21 which allow passage of sound while preventing access to the speaker.

Figure 5:
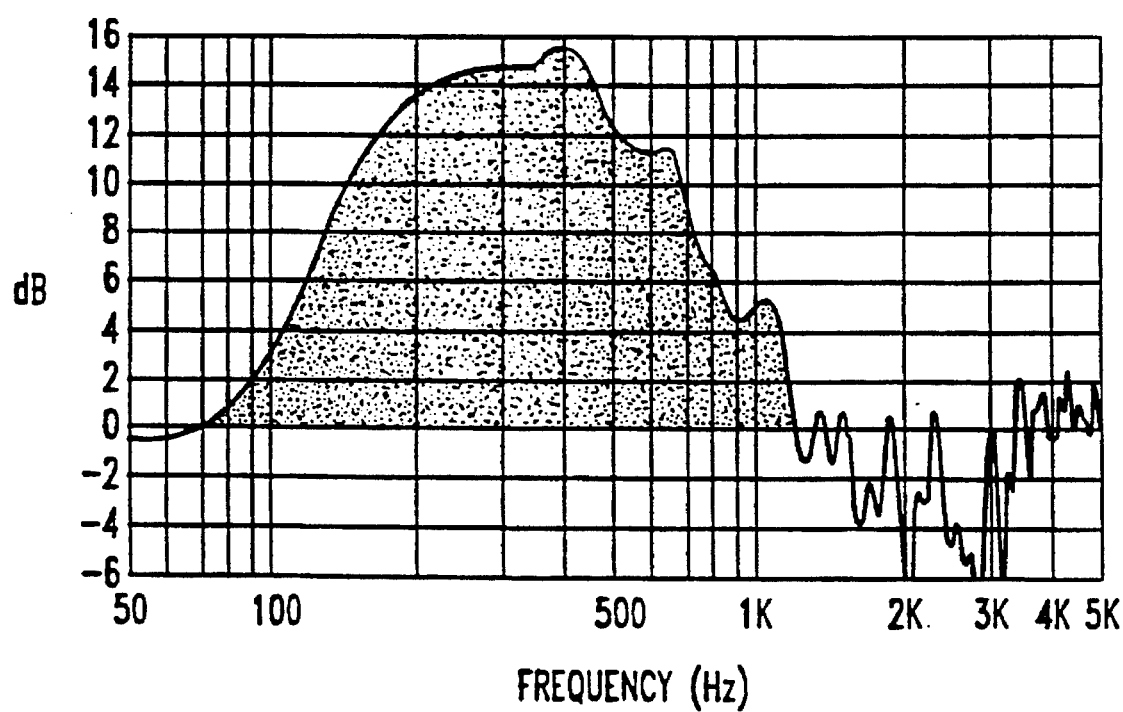
FIG. 5 is a plot showing active noise-cancellation performance of an illustrative inventive embodiment.

The utility of the instant invention may be further appreciated by reference to FIG. 5. There, data on noise cancellation vs. frequency taken from an experiment with a single subject, is plotted for the case where the invention is used with a complementary noise cancellation circuit such as described in the cited patent application. Noise cancellation may be defined as the ratio of the noise power spectrum, at the user's ear, with the cancellation circuit "off", to the noise power spectrum with the circuit "on" measured in dB. The measurements were made at the subject's eardrum using an Etymotic ear probe together with a spectrum analyzer. FIG. 5 shows cancellation performance from 100 Hz to 1100 Hz with over 10 dB of noise cancellation between 130 Hz and 700 Hz; and up to 15 dB at 400 Hz. This frequency band of cancellation is very effective in the typical noisy environments noted earlier. The level of cancellation is sufficient to make otherwise unintelligible incoming speech understandable.

We claim:

1. An ambient noise-reducing telephone handset comprising:

a) a transmitter end and a transmitter cap (11) disposed on said end;

b) a receiver end, a receiver cap (12) disposed on said receiver end, and a receiver (15) mounted in said receiver cap; and c) a noise-cancellation microphone (22), a noise-cancellation control circuit (40), and electrically conductive means (32) connecting said microphone to said circuit; wherein:

d) the receiver cap comprises an earpiece (19) formed around a central aperture;

e) the handset further comprises a housing (23) mounted through the central aperture, the housing comprising an outwardly protruding extension (27) adapted to fit within a user's outer ear cavity;

f) the noise-cancellation microphone is situated within said extension such that in use, said microphone directly samples ambient noise within the user's outer ear cavity;

g) defined within the earpiece is a plurality of radial slots (21) that surrounds the central aperture and constitutes an acoustic grill through which signals from the receiver can pass directly to the user's ear canal; and h) defined within the extension, adjacent the plurality of radial slots, is a plurality of substantially radially-extending sound ports (26) for effecting an acoustic path from the receiver to the noise-cancellation microphone.

2. The handset of claim 1, further comprising an acoustically transmissive pad 28 placed between said microphone 22 and said ports 26 to block particulate matter from entering said receiver cap through said ports 26.

3. The handset of claim 2, further comprising a layer of acoustically transmissive dust and moisture-impermeable material placed over an exterior-facing surface of said pad 28.

4. The handset of claim 3 further comprising an acoustically non-distorting protective screen 31 placed over an exterior-facing side of the receiver 15, for passing sound from said receiver 15 with minimum distortion and energy loss.

5. The handset of claim 4 wherein said receiver cap 12 further comprises an open cell foam 30 contained in a space between said receiver 15 and said microphone 22, said foam adapted to damp resonant modes and reflections emanating from or originating in an internal space of said cap 12 and the ear of the user.

6. The handset of claim 4 wherein said screen 31 comprises a perforated metal disc.

* * * * *